(12) United States Patent
    Chesterfield (10) Patent No.: US 11,431,798 B2
(45) Date of Patent: Aug. 30, 2022

(54) DATA STORAGE SYSTEM

(71) Applicant: OnApp Limited, London (GB)

(72) Inventor: Julian Chesterfield, London (GB)

(73) Assignee: ONAPP LIMITED, London (GB)

( * ) Notice: Subject to any disclaimer, the term of this patent is extended or adjusted under 35 U.S.C. 154(b) by 1228 days.

(21) Appl. No.: 13/788,363

(22) Filed: Mar. 7, 2013

(65) Prior Publication Data

US 2013/0246568 A1 Sep. 19, 2013

(30) Foreign Application Priority Data

Mar. 15, 2012 (GB) ..................................... 1204560

(51) Int. Cl.
    *H04L 67/1097* (2022.01)
(52) U.S. Cl.
    CPC ................................ *H04L 67/1097* (2013.01)
(58) Field of Classification Search
    CPC .................................................. H04L 67/1097
    USPC ................................................. 709/216, 217
    See application file for complete search history.

(56) References Cited

U.S. PATENT DOCUMENTS

| 6,742,020 B1 | 5/2004 | Dimitroff et al. |
| 2004/0139222 A1 | 7/2004 | Slik et al. |
| 2004/0243575 A1 | 12/2004 | Ohashi |
| 2008/0077635 A1 | 3/2008 | Sporny et al. |
| 2012/0166394 A1* | 6/2012 | Kim et al. ..................... 707/634 |
| 2013/0218840 A1* | 8/2013 | Smith ................. G06F 11/1446 707/639 |
| 2013/0239153 A1* | 9/2013 | Deakin et al. .................. 725/88 |
| 2014/0086563 A1* | 3/2014 | Cole et al. ..................... 386/326 |

OTHER PUBLICATIONS

"Information Sharing in Mobile Ad-Hoc Networks: Metadata Management in the MIDAS Dataspace" Munthe-Kaas, E et al. Mobile Data Management: Systems, Services and Middleware 2009. IEEE computer society pp. 252 to 259.

* cited by examiner

Primary Examiner — Adnan M Mirza
(74) Attorney, Agent, or Firm — Stoel Rives LLP (57) ABSTRACT

A decentralised computer storage network is described comprising a plurality of hypervisors or nodes HV1, HV2, HVn. Each storage region in a node is controlled by an associated software controller 11, 12. Each node is configured to prepare a compressed metadata file detailing a snapshot of the data stored in its storage drive. The nodes can broadcast their metadata files so that they can be received by other nodes in the network. This allows each node to be aware of the data stored in the other nodes. By maintaining a local record of metadata files received over the network, each storage node can establish a live picture of the data stored in other storage nodes. This can permit any individual storage node to take decisions that control the distribution of data in the network.

20 Claims, 5 Drawing Sheets

DATA STORAGE SYSTEM

RELATED APPLICATIONS

This application claims priority under 35 U.S.C. § 119 to Great Britain Patent Application No. 1204560.5, filed on Mar. 15, 2012, for "Data Storage System," the disclosure of which is hereby incorporated herein by reference in its entirety.

TECHNICAL FIELD

The present invention relates to a data storage system in which multiple data storage units are connected together over a network.

BRIEF DESCRIPTION OF THE DRAWINGS

Preferred features of the present invention will now be described, purely by way of example, with reference to the accompanying drawings, in which.

DETAILED DESCRIPTION

Cloud storage is an important development in computing whereby users can upload data through an internet portal so that the data can be stored remotely and accessed later from any location or computer. Typically, cloud storage providers maintain data centres for the remote storage of large amounts of data. A data centre typically includes an array of data storage disks, controlled by a central controller. The central controller manages read/write operations to the disks as well as all input/output processes to and from clients that communicate over the internet. A client is likely to be an internet portal that can translate an input/output request from a data centre into something that an end user can handle, such as a file object or a web-based API (Application Programming Interface) call.

A group consisting of a data centre and one or more clients that communicate over a network is sometimes referred to as a Storage Area Network (SAN). A network in this context might be SCSI over IP, SCSI over fibre channel, SCSI over Ethernet, ATA over Ethernet, or others.

The storage capacity of a data centre is generally limited by the properties of the central controller. The central controller can only cope with a finite number of processes at any time, and this places an effective upper limit on the number of data storage disks that can be present, and therefore the overall storage capacity of the system.

According to an aspect of the present invention there is provided a computer data storage network, comprising: a plurality of storage nodes connected together to provide an integrated storage resource; wherein each storage node is configured to broadcast metadata across the network concerning its stored data, and each storage node is configured to receive metadata that are broadcast from other storage nodes; and wherein each storage node is configured to maintain a local record of the metadata received over the network.

By maintaining a local record of the metadata received over the network, each storage node can establish a live picture of the data stored in the other storage nodes. This can permit any individual storage node to take decisions that control the distribution of data in the network. In this way the network can be organised without any central controller because this is replaced by the co-operative decisions of the distributed storage nodes.

The data storage capacity in the integrated resource can be increased by adding further storage nodes, without limit. The system can be scaled easily because there is no central controller whose resources will be depleted by additional nodes. Each additional storage node provides its own processing capabilities, including its own input/output queue, without placing any demands on a common resource. In this way the data storage capacity in the network can be increased by a factor of 10 or 100 without any difficulty.

In this decentralised system, no individual storage node is critical to the network. This means that there is no single point of management or potential failure in the network.

Preferably each storage node is configured to control its own read/write operations as well as communications with other storage nodes in the network. In this way, a cloud Storage Area Network (SAN) can be provided where a number of remote storage nodes are linked together to become an integrated storage resource. The network is decentralised because each storage node can control its own read/write operations and communications over the network. Thus, there is no central controller that provides overall control of the integrated storage resource.

Preferably each storage node comprises a storage unit in which data can be stored, and a software controller for controlling read/write operations, communications with other storage nodes, and the broadcast metadata.

The storage unit may be any type of storage medium, such as a solid-state drive (SSD) or a hard-disk drive (HDD). A number of different types of storage media are typically provided across the network to provide different performance requirements according to user preferences.

The software controller is an embedded Operating System (OS) controller that manages content stored in the physical storage unit. The software controller preferably runs in a virtual machine to enable resource isolation, using the existing hardware in the storage node. The software controller preferably accesses the storage unit directly from the control domain.

Preferably one or more of the storage nodes includes an interface through which a user can upload, modify and/or access data. Any storage node can include a user interface. In practice, however, only a subset of the storage nodes provide the facility for users to upload, modify and access stored data. The interface is preferably provided from the control domain of a hypervisor or from a storage node running as a virtual machine.

A storage node may be configured to select a number of storage nodes when new data are uploaded via the interface, wherein the selection is made using the local record of metadata received over the network. In this way the storage node can select a number of "owning" nodes for a particular set of data. The storage node can then distribute the new data across the owning nodes so that a desirable redundancy is achieved and so that the data can be accessed at a particular rate. Each owning node receives a read or write request from the requesting storage node and executes the storage of written data under its own control and discretion.

The selection of storage nodes is made using the local record of metadata received over the network. The selection criteria may vary according to user preferences. In one example, storage nodes may be selected according to their available data storage capacity.

A user would need to access each of the selected storage nodes in order to edit the uploaded data. A user can be directed to all of the relevant storage nodes easily because all of the storage nodes are aware of the owning nodes for a particular set of data through the metadata that they receive.

The storage nodes may be selected according to at least one of physical location, available data storage capacity, redundancy properties, maximum bandwidth, and disk speed/performance. In one arrangement the storage nodes may be selected to maximise the speed at which data can be accessed. Thus, storage nodes may be selected that have a high maximum bandwidth and that are geographically nearby a user.

In another arrangement storage nodes may be selected according to user preferences. A user may specify that they would prefer their data to be stored with high redundancy or so that it can be accessed rapidly. Storage nodes that offer these properties may be selected accordingly.

In certain arrangements the storage nodes can be selected according to the prices charged for data storage in particular storage nodes. Thus, the storage nodes may be selected so that the data storage costs are minimised, even if this sacrifices performance. Storage node selection based on price is not critical to the key functionality.

The storage node that performs the selection may also be configured to upload the new data to the selected storage nodes. In addition the storage node may be configured to stripe and replicate the new data before it is uploaded to the selected storage nodes. Striping data is desirable as it increases the rate at which the data can be accessed. Replicating the data is desirable as it creates redundancy in the new data.

An owning node preferably stores a single copy of data, referenced by a stripe number. Any single owning node will preferably have a single copy of one of the logical data stripes.

Each storage node is preferably configured to broadcast metadata to the network repeatedly, with a predetermined frequency. By broadcasting metadata on a regular basis each storage node can advertise its current state so that the other storage nodes retain an accurate picture of the state of the network in their local record of received metadata. In addition, each storage node may be configured to detect a possible error if metadata are not received from a particular storage node within a predetermined period of time.

Preferably the broadcast frequency is selected in dependence on the number of storage nodes in the network according to the local record of the received metadata. More specifically the broadcast frequency is preferably inversely proportional to the number of storage nodes in the network. This is advantageous so that the bandwidth required by broadcast metadata does not increase exponentially when the network expands to include new storage nodes. Preferably the broadcast frequency is selected so that the bandwidth required by broadcast metadata remains substantially constant as the number of nodes changes.

Each storage node may comprise a re-balancing module that is configured to re-balance data in the network when predetermined criteria are satisfied. Re-balancing data may involve a re-distribution of data. This may be necessary, for example, if connection to the one of the storage nodes is lost. In these circumstances a re-balancing module in one of the storage nodes may expel the relevant storage node from a group of 'owning' nodes for a particular data set, and a new storage node may be added. The data that were stored in the expelled storage node may be copied to the new storage node, using redundant data in the network. The broadcast metadata from each storage node may reflect the fact that a storage node has been expelled and a new storage node has been added.

Re-balancing may also occur if one of the storage nodes in the network is 'out of synch' with the other nodes. Each storage node may include an entry in its broadcast metadata indicating its time of last update. Preferably all of the storage nodes are updated synchronously so that, together, they contain an up-to-date data set. A storage node may contain old data if it has temporarily lost contact with one or more of the storage nodes.

The metadata broadcast by each storage node may include information concerning the properties of the node. In addition, each storage node may include a de-duplication module that is configured to remove duplicate entries in its stored data.

According to an aspect of the present invention there is provided a method of operating a computer data storage network that comprises a plurality of storage nodes connected together to provide an integrated storage resource, the method comprising the steps of: providing independent control logic at each storage node for read/write operations as well as communications with other storage nodes in the network; broadcasting metadata across the network from each storage node concerning the data stored therein; receiving the broadcast metadata at each storage node; and maintaining a record at each storage node concerning the metadata received over the network.

Any apparatus features may be embodied as method steps and vice-versa.

According to another aspect of the invention a computer readable storage medium is provided having a computer program stored thereon, the computer program comprising: a program module configured to provide control logic at a storage node for read/write operations and control logic for communicating with other storage nodes in a network; a program module configured to control a storage node to broadcast metadata across the network concerning the data stored therein; a program module configured to receive the broadcast metadata from other storage nodes in the network; and a program module configured to maintain a record concerning the metadata received over the network.

Figure 1:
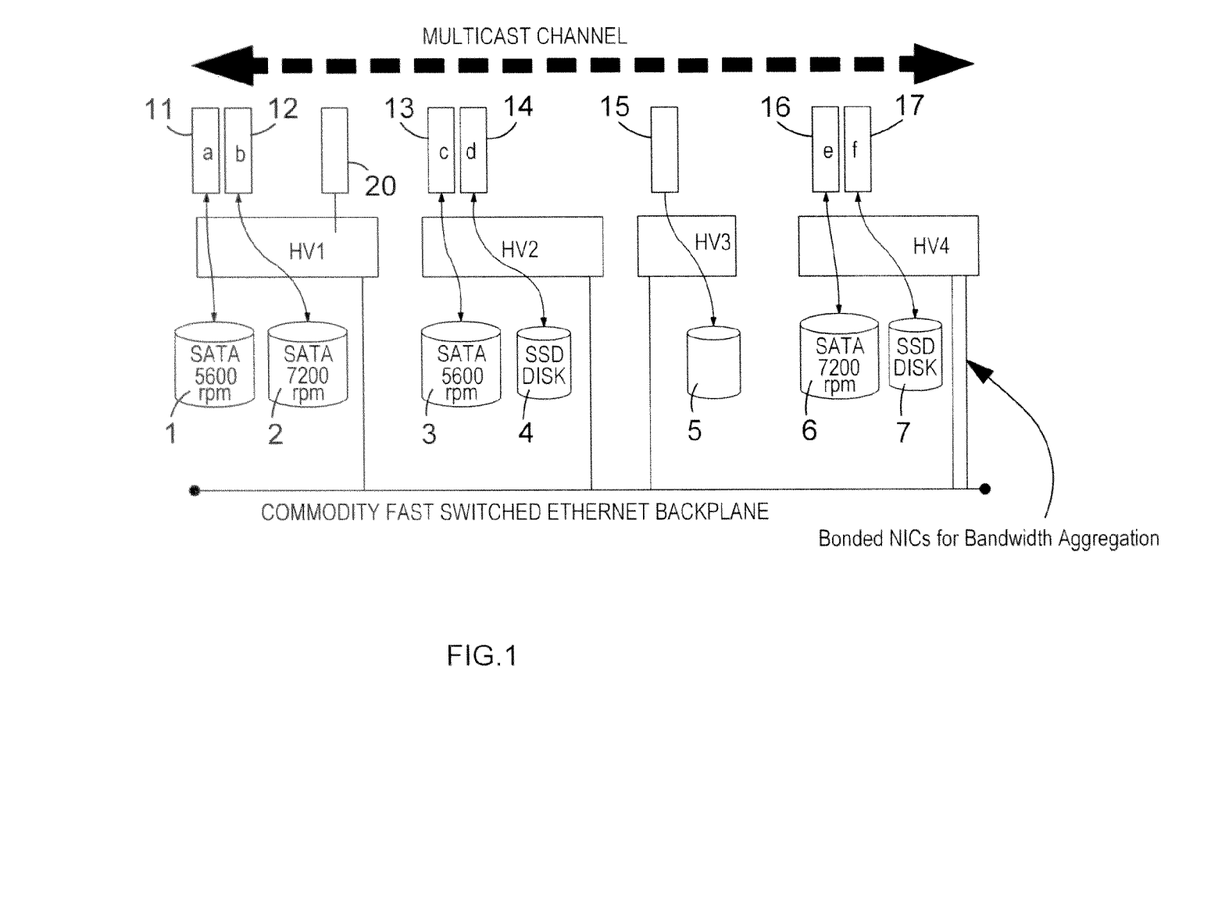
FIG. 1 is a representation of a computer storage network in an embodiment of the invention.

FIG. 1 shows a decentralised computer storage network comprising a plurality of hypervisors HV1, HV2, HVn. Each hypervisor comprises one or more independent storage disks that participate in the network. For example the first hypervisor HV1 comprises a first hard disk drive 1, with a speed of 5600 rpm, and a second hard disk drive 2, with a speed of 7200 rpm. Hypervisor HV3 comprises a single independent storage disk 5, which is a solid state drive (SSD).

Each storage region in a hypervisor is controlled by an associated software controller. Thus, the first hard disk drive 1 in hypervisor HV1 is controlled by software controller 11 and the second hard disk drive 2 is controlled by software controller 12. The combination of a storage region and a software controller results in an individual storage node in the computer storage network.

The software controllers 11, 12 are installed in the hypervisors' existing hardware. They create virtual machines that can control all operations in the associated storage region. Specially, the software controllers are smart minimal embedded operating system (OS) controllers that manage the content stored on the associated storage region. The software controllers 11, 12 are responsible for handling input/output streams to the storage drives, and for ensuring that data are stored persistently and efficiently on the physical drive.

The software controller in each node is capable of communicating over one or more dedicated network interface cards (NICs) on the relevant hypervisor HV1. All NICs across the hypervisors are capable of communicating over the same logical subnet, either through direct physical connection to a switch, VLAN enablement, or transparent wide area VPN membership.

All unique identifying data for a node is contained persistently on the storage drive. This means that any single storage drive is physically portable in the network. For example, the first hard disk drive 1 could be removed from hypervisor HV1 and connected to hypervisor HV2. The node would disappear from the network when it is removed. However, a new software controller would initialise in hypervisor HV2 and would associate itself with the hard disk drive 1. The new software controller could then advertise the node's new location over the network. This may be useful in disaster recovery so that a drive could be relocated if a hypervisor fails. It may also be useful during a hypervisor upgrade so that physical drives can be removed to a new location while the upgrade occurs.

Hypervisor HV1 includes portal software 20. The portal software 20 allows the hypervisor HV1 to operate as a portal node. The portal node is a gateway interface to the public internet through which an authenticated user can store and retrieve storage objects over the network.

Figure 2:
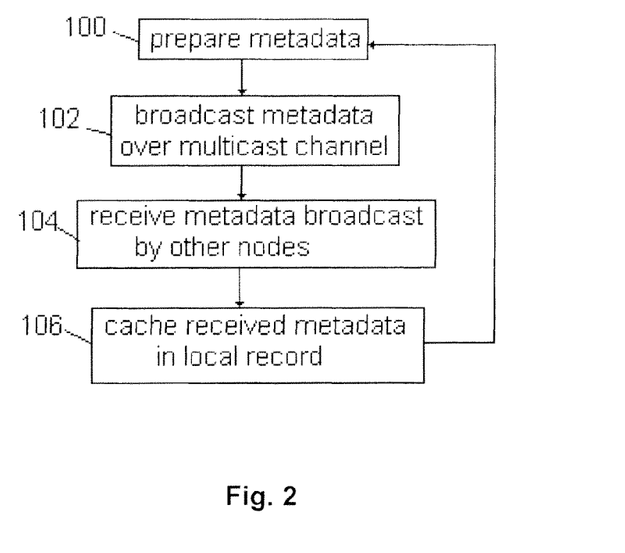
FIG. 2 is a flow chart showing a sequence of steps undertaken by a storage node in a computer storage network in an embodiment of the invention.

FIG. 2 is a flow chart showing the steps that are performed periodically by a node in the network. Each node is configured to perform the same sequence of steps. At step 100 the node prepares a compressed metadata file detailing a snapshot of the data stored in its associated storage drive. The metadata file includes a highly compressed summary of the data stored in the storage drive. In addition, the metadata file includes further information regarding the properties of the node such as its physical location, its access speed, its redundancy properties, and the date at which the data were last modified.

At step 102 the node is configured to broadcast the metadata file over the multicast channel so that every other node in the network can receive it. This allows each node to be aware of the state of the other nodes. At step 104 the node receives metadata broadcast from other nodes.

At step 106 the node is configured to store or update a local record of the received metadata. Thus, each node can maintain a local copy of the metadata received from every other node in the network. This can allow the software controller to make decisions concerning the distribution of data in the network. The local record is volatile and metadata updates are cached only while the relevant node is running.

Each node is configured so that it adjusts the frequency at which metadata are broadcast in step 102 in dependence on the information in the local record of received metadata. Specifically, the broadcast frequency is inversely proportional to the number of nodes from which metadata are received. In this way, the system can be arranged so that the total bandwidth required by broadcast metadata remains the same, independent of the number of nodes in the network.

Figure 3:
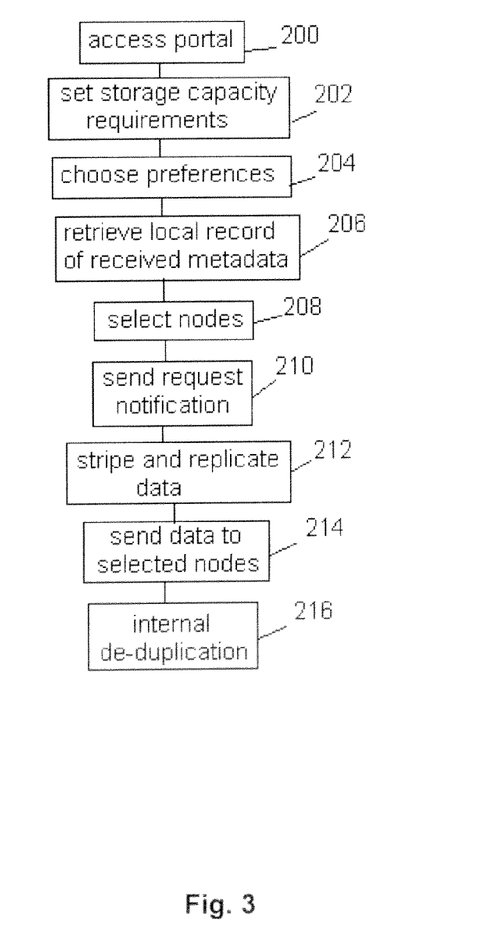
FIG. 3 is a flow chart showing the steps that can be taken to upload data to a computer storage network in an embodiment of the invention.

FIG. 3 is a flow chart showing the steps that can be taken for a user to upload data to a computer storage network. At step 200 a user can access an internet portal that will connect the user to one of the nodes in the network. The internet portal is configured to connect the user to a suitable node based on, for example, physical proximity between the user and the available nodes. Once connected to the user the selected node can behave as a 'portal' node.

A subset of nodes may be capable of behaving as 'portal' nodes. These nodes typically include a connection to a financial clearinghouse so that the user can be charged for uploading and accessing data.

At step 202 the user is connected to a portal node and the user can set their data storage requirements. For example, a user can specify that they require a certain storage capacity. At step 204 the user can specify preferences for the data to be uploaded. For example, a user may specify that they would prefer their data to be stored with high redundancy or so that it can be accessed rapidly.

At step 206 the portal node is configured to retrieve its local record of the metadata received over the network. The local record can be used to create a live picture of the state of storage nodes in the network.

At step 208 the portal node is configured to select a number of nodes, based on the local record of received metadata. The nodes may be selected by analysing the local record of received metadata in combination with the user's preferences. For example, if a user has specified that they need to access data rapidly, the portal node may select nodes that are geographically near the user and have fast data access properties. In another example, the user has specified that they require a cheaper service so the portal node may select nodes with a slower data access speed, since these nodes may charge less for data storage capacity.

The data storage devices may be categorised according to their performance requirements. For example, the access speed may be categorised as high (greater than 160 MB/s), medium (greater than 100 MB/s, but less than 160 MB/s), and low (less than 100 MB/s).

At step 210 the portal node sends a request notification to all of the selected nodes to establish whether they are able to receive the user's data. Each node reviews the request notification and makes an independent decision about whether it is able to receive the data, responding appropriately to the portal node. The nodes that are selected for a new data set are all 'owning' nodes for that data.

At step 212 the portal node stripes and replicates the data to be uploaded. The data are striped so that they can be accessed quickly from a number of distributed nodes. The data are replicated to ensure that the data can still be accessed in its entirety should there be an error in the network. This ensures that the data storage network has an appropriate level of redundancy.

At step 214 the striped data are sent to the selected nodes so that they can be stored. An atomic transaction protocol is utilised to ensure that all end points are synchronised and the data can be stored successfully. At step 216 each node receives the striped data and analyses whether the data are already present in the storage drive. This internal de-duplication ensures that data are stored efficiently in each node.

The portal node is only used as a point of entry for the user to access the network. The identity of the portal node is not important, and any other node could fulfil this function. Thus, there is no single central controller in the network and correspondingly there is no single point of potential failure.

Figure 4:
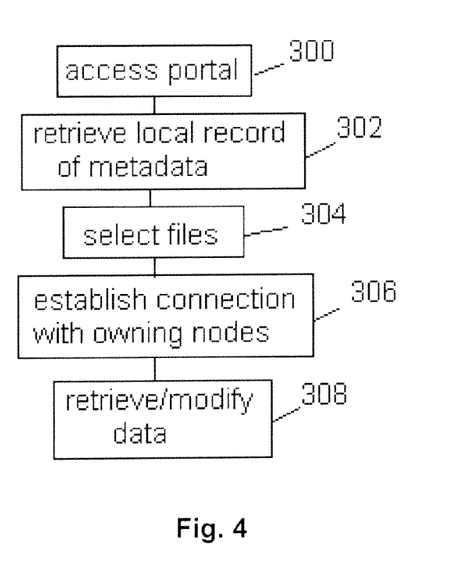
FIG. 4 is a flow chart showing the steps that can be taken to access data stored in a computer storage network in an embodiment of the invention.

FIG. 4 is a flow chart showing the steps that can be taken to access data stored in the computer storage network. At step 300 a user can access an internet portal that will connect the user to one of the nodes in the network. Once connected to the user the selected node can behave as a 'portal' node.

At step 302 the portal node is configured to retrieve its local record of the metadata received over the network so that it can create a picture of all of the data files. The user can then be presented with a list of data files associated with that user. At step 304 the user can select the data files to which access is required.

At step 306 the portal node is configured to establish a connection with all synchronised nodes where relevant data is stored, using the local record of received metadata. At step 308 the user can access and/or modify data that are distributed across the storage nodes.

The portal node does not need to establish a connection with all 'owning' nodes for a particular data set at step 306. In fact, only half of the 'owning' nodes need to be available to create a full data set because of redundancy in the network. This means that data can still be recovered even if a network has been partitioned and only a subset of nodes can still communicate with one another.

Figure 5:
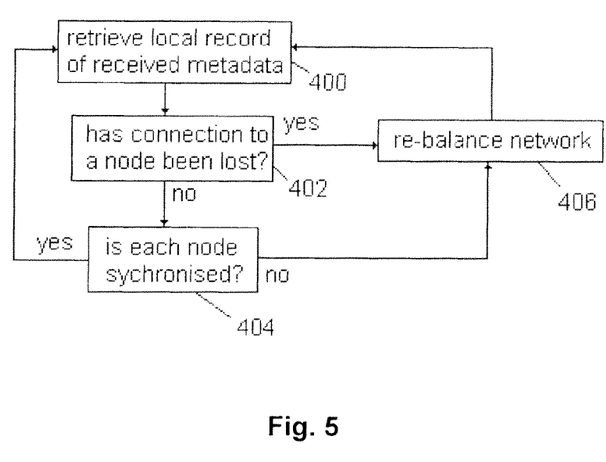
FIG. 5 is a flow chart showing a sequence of steps that can be undertaken by a node to re-balance data in the network.

FIG. 5 is a flow chart showing a sequence of steps that can be undertaken by a node to re-balance data in the network. At step 400 the node retrieves its local record of received metadata. At step 402 the node determines whether a connection to one of the storage nodes has been lost. This can be achieved by analysing the time stamp of metadata received from the different nodes. If one of the node's metadata indicates an unacceptable amount of time has elapsed since the last meta-data were received then the node may instigate a re-balancing routine.

At step 406 the node commences a re-balancing routine by expelling the node to which connection has been lost. To cope with the loss of a node the data previously present on the expelled node must be copied to a new node in the network. These data can be constructed using redundant data in the network so that the node can be fully replaced. The node is arranged to send an expulsion notification to all nodes in the network so that they can update their local record of received metadata.

When a new node is added to the network it is necessary to replicate the data on the expelled node, which can be achieved using redundant data in the network. In order to optimise efficiency in the network the data stored in the new node are analysed before any data is transferred to determine whether the stored data share any properties with the target data. In this way data transfer efficiency can be optimised by transferring only the difference data between the stored data and the target data.

At step 404 the node analyses whether all nodes in the network are properly synchronised. This is achieved by checking the date at which data were last modified for each of the relevant nodes. A node may be unsynchronised if data were last modified at an earlier time than the other nodes. If a node is found to be unsynchronised the node is expelled at step 406 and a replacement node is appointed.

Other embodiments of the invention are possible. Although the description above contains much specificity, these should not be construed as limiting the scope of the invention, but as merely providing illustrations of some of the presently preferred embodiments of this invention. Various combinations or sub-combinations of the specific features and aspects of the embodiments may be made and still fall within the scope of the invention. Various features and aspects of the disclosed embodiments can be combined with or substituted for one another in order to form variations of the disclosed embodiments of the present invention. Thus, it is intended that the scope of at least some of the present invention herein disclosed should not be limited by the particular disclosed embodiments described above. The scope of the present invention should, therefore, be determined only by the following claims.

What is claimed is:

1. A computer data storage network, comprising:
   a plurality of storage nodes connected together to provide an integrated storage resource;
   wherein each storage node is configured to prepare a file including information concerning data stored at the storage node, and to send the file to the other storage nodes in the computer data storage network, and wherein each storage node is configured to receive files that are sent by the other storage nodes; and
   wherein each storage node is configured to maintain a local record of the files received over the computer data storage network.

2. The computer data storage system of claim 1 wherein each storage node is configured to manage its own stored data as well as communications with other storage nodes in the computer data storage network.

3. The computer data storage system of claim 1 wherein each storage node comprises a storage unit in which data can be stored, and a software controller for controlling read/write operations and communications with other storage nodes.

4. The computer data storage system of claim 1 wherein one or more of the storage nodes includes an interface through which a user can upload, modify and/or access data.

5. The computer data storage system of claim 4 wherein a storage node is configured to select a number of storage nodes when new data are uploaded via the interface, wherein the selection is made using the local record of files received over the computer data storage network.

6. The computer data storage system of claim 5 wherein the storage nodes are selected according to at least one of physical location, available data storage capacity, redundancy properties, and maximum bandwidth.

7. The computer data storage system of claim 5 wherein the storage node that performs the selection is also configured to upload the new data to the selected storage nodes.

8. The computer data storage system of claim 7 wherein the storage node is configured to stripe and replicate the new data before it is uploaded to the selected storage nodes.

9. The computer data storage system of claim 1 wherein each storage node is configured to broadcast files to the computer data storage network repeatedly, with a predetermined frequency.

10. The computer data storage system of claim 9 wherein the frequency is selected in dependence on the number of storage nodes in the computer data storage network according to the local record of the received files.

11. The computer data storage system of claim 1 wherein each storage node comprises a re-balancing module that is configured to re-balance data in the computer data storage network when predetermined criteria are satisfied.

12. The computer data storage system of claim 1 wherein the file prepared by each storage node also includes information concerning properties of the node.

13. The computer data storage system of claim 1 wherein each storage node includes a de-duplication module that is configured to remove duplicate entries in its stored data.

14. A method of operating a computer data storage network that comprises a plurality of storage nodes connected together to provide an integrated storage resource, the method comprising:

providing independent control logic at each storage node;

preparing a file at each storage node including information concerning the data stored at the storage node;

sending the prepared file from the storage node to the other storage nodes in the computer data storage network;

receiving the file at each storage node; and maintaining a record at each storage node concerning the files received over the computer data storage network.

15. A non-transitory computer readable storage medium having a computer program stored thereon, the computer program comprising:

a program module configured to provide control logic at a storage node so that the storage node can communicate with other storage nodes in a computer data storage network;

a program module configured to prepare a file at each storage node including information concerning the data stored at the storage node;

a program module configured to send the prepared file from the storage node to the other storage nodes in the computer data storage network;

a program module configured to receive the files from other storage nodes in the computer data storage network; and a program module configured to maintain a record concerning the files received over the computer data storage network.

16. A cloud storage network comprising:

a plurality of storage nodes connected together to provide an integrated storage resource;

wherein each storage node is configured to prepare a file including information providing a highly compressed summary of data stored at the storage node and to send the file to the other storage nodes in the cloud storage network wherein each storage node is configured to receive files that are sent by the other storage nodes; and wherein each storage node is configured to maintain a local record of the files over the cloud storage network.

17. The cloud storage network of claim 16, wherein the plurality of storage nodes is configured to receive the data through an internet portal and enable access to the data from any location or computer.

18. The cloud storage network of claim 16, wherein a storage node of the plurality of storage nodes is configured to store unique identifying data for the storage node.

19. The cloud storage network of claim 16, wherein redundant data on the cloud storage network is used to replicate data from an expelled storage node and store the replicated data on a new storage node.

20. The cloud storage network of claim 16, wherein responsive to a detection that a connection to one of the plurality of storage nodes has been lost, the one of the plurality of storage nodes is expelled from the cloud storage network.

* * * * *